(12) United States Patent
Paindavoine

(10) Patent No.: US 10,973,314 B2
(45) Date of Patent: Apr. 13, 2021

(54) INNER ORGAN FOR A VEHICLE, HAVING A RETRACTABLE SHELF

(71) Applicant: FAURECIA INTERIEUR INDUSTRIE, Nanterre (FR)

(72) Inventor: Romain Paindavoine, Louvres (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 16/752,036

(22) Filed: Jan. 24, 2020

(65) Prior Publication Data

US 2020/0237092 A1 Jul. 30, 2020

(30) Foreign Application Priority Data

Jan. 24, 2019 (FR) ..................... 19 00600

(51) Int. Cl.
*A47B 5/00* (2006.01)
*A47B 3/04* (2006.01)
*A47B 31/06* (2006.01)
*B60N 3/00* (2006.01)

(52) U.S. Cl.
CPC ............... *A47B 5/006* (2013.01); *A47B 3/04* (2013.01); *A47B 31/06* (2013.01); *B60N 3/001* (2013.01); *A47B 2200/0035* (2013.01)

(58) Field of Classification Search
CPC .. A47B 5/006; A47B 3/04; A47B 3/00; A47B 31/06; B60N 3/001; B60R 7/06; B60R 2011/005; B60R 5/006; B60R 3/04; B60R 3/00; E05B 83/30
USPC ...... 108/40, 45, 44, 47, 48; 296/37.12, 37.1, 296/37.8
See application file for complete search history.

(56) References Cited

U.S. PATENT DOCUMENTS

| 1,790,468 | A | * | 1/1931 | Frank et al. | ............. A47C 7/70 108/38 |
| 2,270,557 | A | * | 1/1942 | Randall | .................. B60N 3/002 108/45 |
| 2,270,948 | A | * | 1/1942 | Howe | ..................... B60R 7/081 108/45 |

(Continued)

FOREIGN PATENT DOCUMENTS

DE    19708070 B4    12/2005
EP    2722231 A1    4/2014

(Continued)

OTHER PUBLICATIONS

French Search Report corresponding to French application No. FR 1900600, dated Oct. 22, 2019, 2 pages.

*Primary Examiner* — Jose V Chen
(74) *Attorney, Agent, or Firm* — Reising Ethington P.C.

(57) ABSTRACT

An inner organ for a vehicle, including a retractable shelf, extending between a free end and an end for connecting to a movement mechanism, and deployable between a retracted position and a deployed position. The movement mechanism includes: at least one first rail, extending between a lower end and an upper end; for each first rail, a cursor movable along this first rail, and coupled to the connecting end of the shelf; and an element for blocking the shelf in the deployed position. The blocking element is connected to the connecting end of the shelf by a pivot link, is movable along a second rail, and cooperates in the deployed position with a wall arranged at the connecting end of the shelf.

10 Claims, 4 Drawing Sheets

(56) References Cited

U.S. PATENT DOCUMENTS

| | | | | |
|---|---|---|---|---|
| 2,487,537 | A | * | 11/1949 | Gantner .................. B60R 7/084 221/46 |
| 2,588,706 | A | * | 3/1952 | Davis ..................... B60N 3/002 108/45 |
| 2,621,093 | A | * | 12/1952 | Merhige ................. B60N 3/002 108/45 |
| 2,717,816 | A | * | 9/1955 | Turner ................... B60N 3/002 108/45 |
| 2,719,066 | A | * | 9/1955 | Budzinski .............. A47B 31/06 108/33 |
| 3,503,648 | A | * | 3/1970 | James ...................... B60R 7/06 296/37.12 |
| 3,606,112 | A | * | 9/1971 | Cheshier ................ B60N 3/102 224/554 |
| 3,899,982 | A | * | 8/1975 | Fetzek ................... A47B 31/06 108/25 |
| 4,111,133 | A | * | 9/1978 | Bailey .................... B60R 11/00 108/45 |
| 4,792,174 | A | * | 12/1988 | Shioda ................... B60N 3/002 108/45 |
| 5,297,709 | A | * | 3/1994 | Dykstra ................. B60N 3/102 224/281 |
| 5,899,426 | A | * | 5/1999 | Gross .................... B60N 3/102 224/926 |
| 6,520,091 | B1 | * | 2/2003 | Dettmers ............... A47B 5/006 108/42 |
| 7,407,212 | B2 | * | 8/2008 | Kataoka .................. B60R 7/06 224/483 |
| 8,602,476 | B2 | * | 12/2013 | Doll ........................ B60R 7/06 296/37.12 |
| 2008/0190329 | A1 | | 8/2008 | Boyd et al. |
| 2014/0110962 | A1 | * | 4/2014 | Bohnenberger ......... B60R 7/06 296/37.12 |
| 2016/0297368 | A1 | * | 10/2016 | Huebner ................ B60R 11/00 |
| 2017/0181536 | A1 | | 6/2017 | De Saulles et al. |

FOREIGN PATENT DOCUMENTS

| | | |
|---|---|---|
| EP | 3063039 A1 | 9/2016 |
| FR | 2775639 A1 | 9/1999 |
| FR | 2902724 A1 | 12/2007 |
| JP | 06211082 A * | 8/1994 |
| WO | WO2011146554 A1 | 11/2011 |
| WO | WO2015063412 A1 | 5/2015 |
| WO | WO2017165115 A1 | 9/2017 |

* cited by examiner

INNER ORGAN FOR A VEHICLE, HAVING A RETRACTABLE SHELF

TECHNICAL FIELD

The present invention relates to an inner organ (i.e., an interior structure) for a vehicle, having a retractable shelf.

BACKGROUND

Such a shelf is generally movable between a retracted position, in which its bulk is minimal, and a deployed position, in which the shelf is suitable for being used by a passenger and for placing objects thereupon.

SUMMARY

The invention in one aspect aims to provide a shelf having a high perceived quality, while being fully integrated into the inner organ, that is to say, without affecting the typical architecture of this inner organ.

To that end, the invention in particular relates to an inner organ for a vehicle, including a retractable shelf, extending between a free end and an end for connecting to a movement mechanism, and deployable between a retracted position and a deployed position, characterized in that the movement mechanism includes:
- at least one first rail, extending between a lower end and an upper end,
- for each first rail, a cursor movable along this first rail, and coupled to the connecting end of the shelf, and
- an element for blocking the shelf in the deployed position, connected to the connecting end of the shelf by a pivot link, and movable along a second rail, the blocking element cooperating, in the deployed position, with a wall arranged at the connecting end of the shelf.

The inner organ may further include one or more of the following features, considered alone or according to any technically possible combinations:
- The inner organ includes a visible wall, the shelf having a lower face and an upper face, and being configured so that in the retracted position, the lower face is flush with the visible wall.
- The first rail has a substantially curved portion.
- The cursor is connected to the shelf by means of a rod.
- In the retracted position, the cursor is at the lower end of the first rail and the rod extends substantially parallel to the first rail, and in the deployed position, the cursor is at the upper end of the first rail, and the rod is separated from the first rail.
- The blocking element includes an extension substantially parallel to the second rail, having a first face facing toward the second rail and a second face opposite the first face, and the shelf includes, at its connecting end, a recess formed by first and second planar walls, coming together at the pivot link, such that: the first wall cooperates with the first face of the blocking element in the retracted position, and the second wall cooperates with the second face of the blocking element in the deployed position.
- The inner organ is hollow and includes an inner space, and includes a masking web, coupled to the connecting end of the shelf, suitable for being hidden in the retracted position, and visible in the deployed position so as to hide, below the shelf, the inner space.
- The inner organ forms a dashboard, a door panel, a center console, or a rear seat panel.
- The inner organ is hollow and includes an inner space, each first rail and each second rail being housed in the inner space.

The invention also relates to a motor vehicle, characterized in that it includes an inner organ as previously defined.

BRIEF DESCRIPTION OF THE DRAWINGS

Various aspects and advantages of the invention will appear upon reading the following description, provided solely as a non-limiting example and done in reference to the appended figures, in which.

DETAILED DESCRIPTION OF THE ILLUSTRATED EMBODIMENT

The figures partially show an inner organ 10 suitable for equipping a passenger compartment of a vehicle, for example of a motor vehicle.

The inner organ 10 can be a dashboard, a door panel, a center console, a rear seat element, or any other conceivable interior structure.

The inner organ 10 has at least one visible wall 11. The inner organ 10 is preferably hollow, the visible wall 11 delimiting an inner space.

Figure 1:
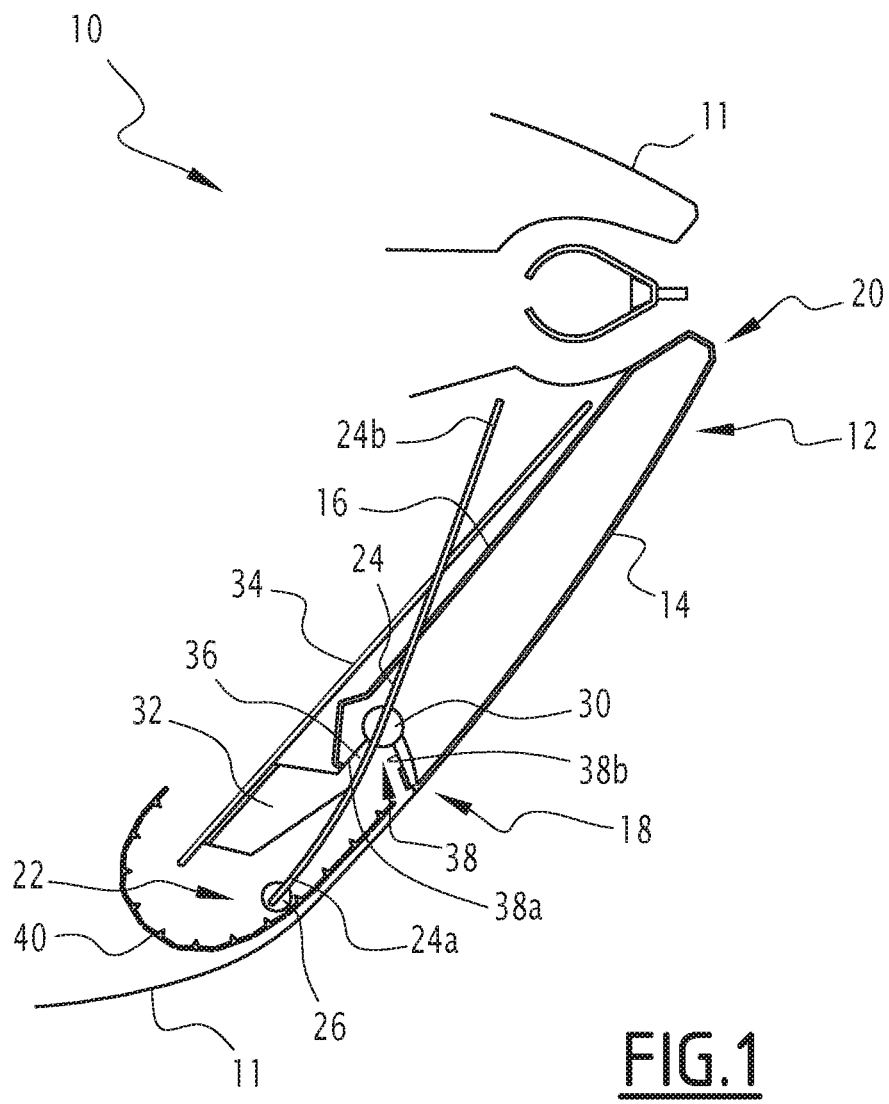
FIG. 1 is a cross-sectional view of an inner organ according to one exemplary embodiment of the invention, comprising a shelf shown in a retracted position.
Figure 2:
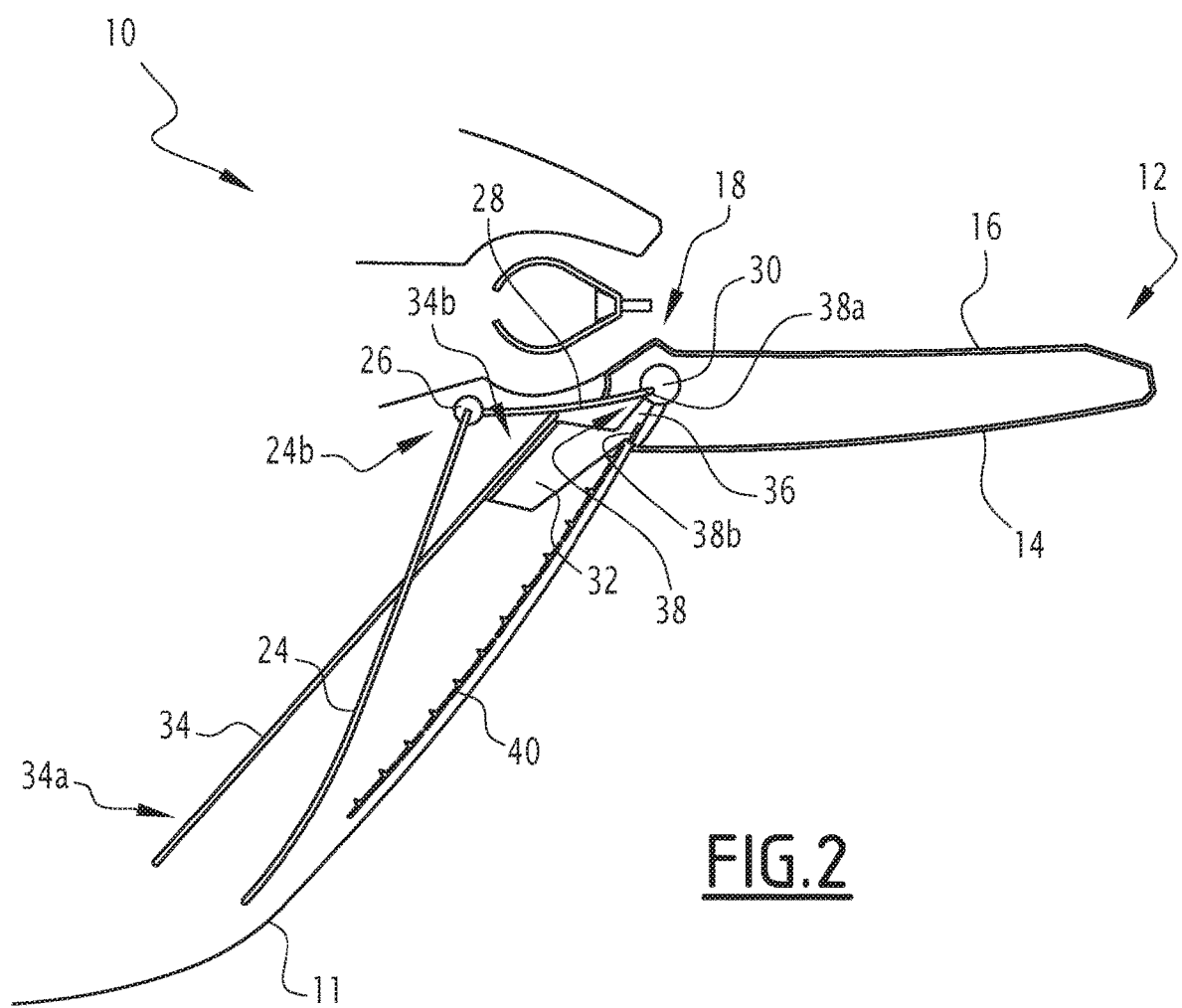
FIG. 2 is a view similar to FIG. 1 of the inner organ of this FIG. 1, in which the shelf is shown in a deployed position.

The inner organ 10 includes a retractable shelf 12, movable between a retracted position, shown in FIG. 1, and a deployed position, shown in FIG. 2. The shelf 12 extends substantially horizontally in the deployed position.

The shelf 12 has a lower face 14 and an opposite upper face 16, and extends between a connecting end 18 and a free end 20. The upper face 16 is suitable for forming, in the deployed position, a receiving surface for objects, such as a digital tablet, a laptop computer, a book, food, or the like.

Figure 3:
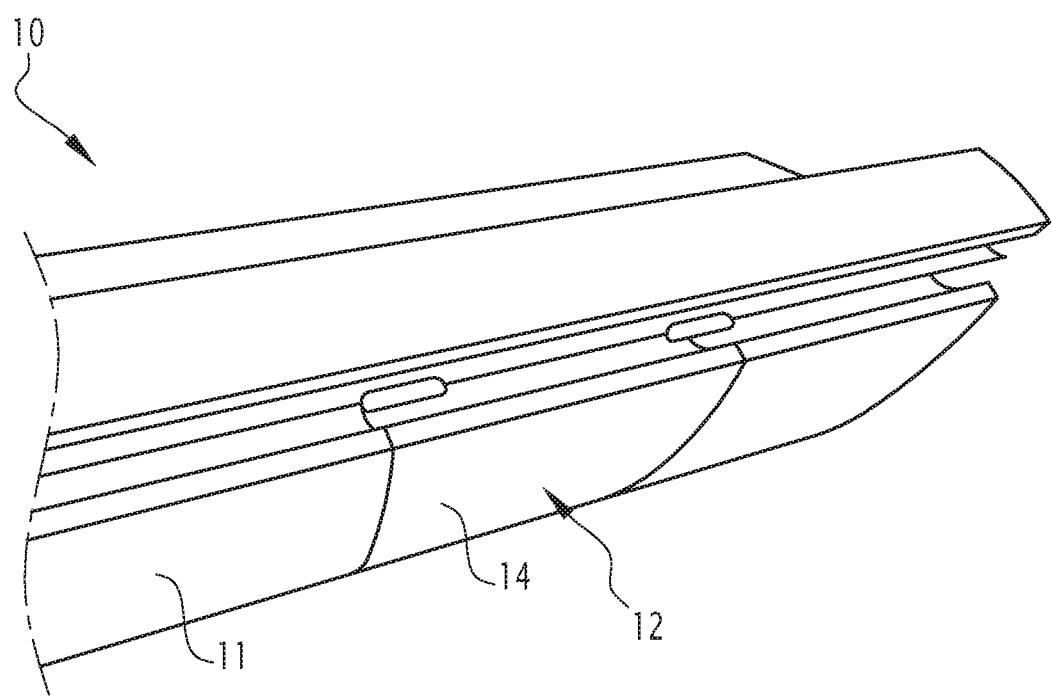
FIG. 3 is a perspective view of the inner organ of FIG. 1.
Figure 4:
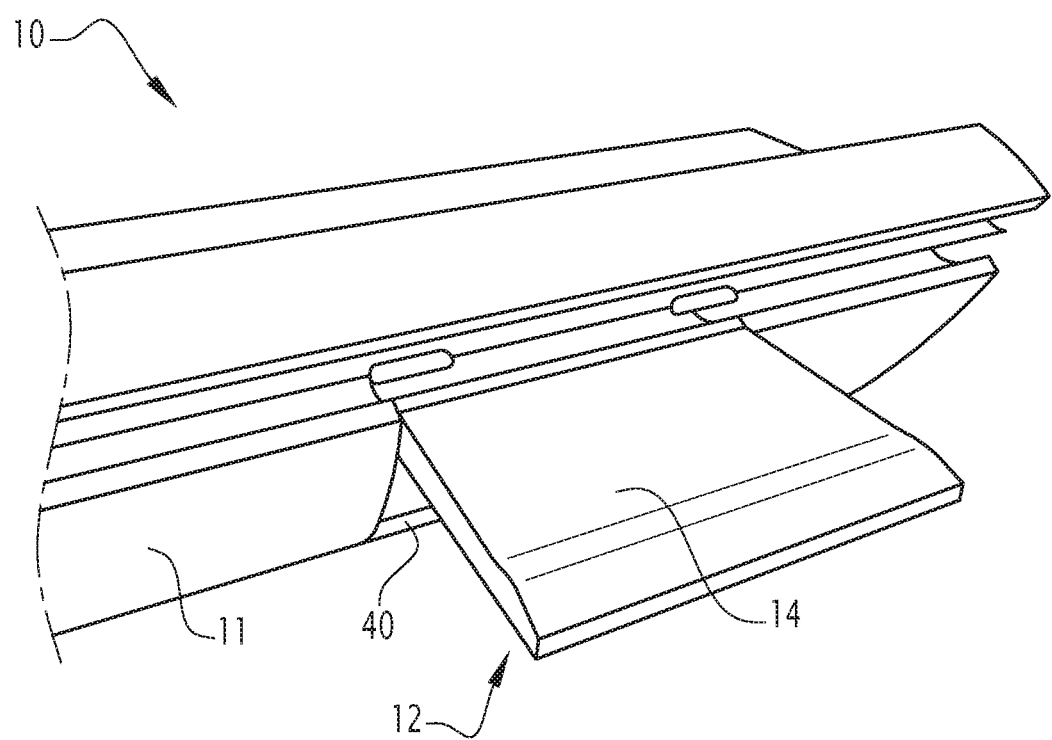
FIG. 4 is a perspective view of the inner organ of FIG. 2.

In the retracted position, the shelf 12 delimits the inner space with the visible wall 11. The lower face 14 is preferably flush with the visible wall 11. Thus, the lower face 14 forms part of the visible wall. This lower face 14 preferably has an appearance similar to that of the visible wall 11, such that the general appearance of the inner organ 10 is homogeneous when the shelf 12 is in the retracted position, as shown in FIG. 3.

The inner organ 10 also includes a device 22 for moving the shelf 12. Advantageously, the movement device 22 is housed entirely in the inner space. Thus, this movement device is not visible for a user, at least when the shelf 12 is in the retracted position and in the deployed position.

The movement mechanism 22 includes at least one first rail 24, extending between a first lower end 24*a* and a second upper end 24*b*. Each first rail 24 is preferably housed in the inner space. Thus, this first rail 24 is not visible for a user, at least when the shelf 12 is in the retracted position and in the deployed position.

In the described example, the first rail 24 has a substantially curved portion. For example, the first rail 24 includes a substantially straight lower portion and a substantially straight upper portion, forming a non-nil rounded angle between them. The advantage of this curve lies in guiding the shelf according to a fluid kinematic.

Preferably, the movement mechanism 22 includes two first rails 24, arranged on either side of the shelf 12, each one near a respective lateral end of the shelf 12. These first two rails 24 are parallel to one another.

The movement mechanism 22 also includes, for each first rail 24, a respective cursor 26 that is rotatable and translatable along this first rail 24. This cursor 26 is for example coupled to the shelf 12 by means of a rod 28 (visible in FIG. 2).

According to a variant that is not shown, the cursor 26 is directly coupled to the shelf 12, with no intermediary, and in particular with no intermediary rod 28.

The rod 28 is preferably connected to the connecting end 18 of the shelf 12 by a fixed connection.

In the retracted position (FIG. 1), the cursor 26 is at the lower end 24a of the corresponding first rail 24, and the rod 28 extends substantially parallel to the first rail 24.

In the deployed position (FIG. 2), the cursor 26 is at the upper end 24b of the corresponding first rail 24, and the rod 28 is separated from the first rail 24.

The movement mechanism 22 also includes a blocking element 32, connected to the connecting end 18 of the shelf 12, by a pivot link 30. The blocking element 32 is translatable along a second rail 34. The second rail 34 extends between a low end 34a and a high end 34b. The blocking element 32 is at the low end in the retracted position (FIG. 1) and the high end in the deployed position (FIG. 2). The second rail 34 is preferably substantially rectilinear.

Each second rail 34 is preferably housed in the inner space. Thus, this second rail 34 is not visible for a user, at least when the shelf 12 is in the retracted position and in the deployed position.

The blocking element 32 includes an extension 36 substantially parallel to the second rail 34, having a first face facing the second rail 34 and a second face opposite the first face.

The shelf 12 includes, at its connecting end 18, a recess 38 formed by first 38a and second 38b planar walls, coming together at the pivot link 30.

In the coordinate system of FIGS. 1 and 2, which also corresponds to a coordinate system during normal use, the first wall 38a is oriented downward in a vertical direction, whether the shelf 12 is in the retracted position or the deployed position.

It will be recalled that a shelf is said to be "oriented downward" when the normal to this wall has a non-nil downward vertical component.

In the retracted position, the first wall 38a of the recess 38 cooperates with the first face of the blocking element 32, such that the shelf 12 cannot pivot upward (counterclockwise direction in FIG. 1) around the pivot link 30.

In a variant, or additionally, the shelf 12 in the retracted position can be blocked in upward rotation by a blocking part arranged on the visible wall 11 and cooperating with a complementary stop shape arranged at the free end 20 of the shelf 12.

Likewise, the shelf 12 in the deployed position can be blocked in downward rotation by a blocking part arranged on the visible wall 11 and cooperating with a complementary stop shape arranged at the connecting end 18 of the shelf 12.

Thus, in one preferred variant, the shelf includes stop shapes identical or similar to the two connecting 18 and free 20 ends.

The second wall 38b is oriented upward in the deployed position.

It will be recalled that a wall is said to be "oriented upward" when the normal to this wall has a non-nil upward vertical component.

In this deployed position, the second wall 38b of the recess 38 cooperates with the second face of the blocking element 32, such that the shelf 12 cannot pivot downward (clockwise direction in FIG. 2) around the pivot link 30. Advantageously, the second wall 38b is substantially parallel to the second rail 34 when the shelf 12 is in the deployed position.

Advantageously, the inner organ 10 includes a concealing web 40, coupled to the connecting end 18 of the shelf 12, and movable along a guide (not shown). The guide is for example formed by an inner wall of the inner organ, against which the concealing web 40 moves.

In the retracted position, the concealing web 40 is concealed, for example by being wound by the guide. In the deployed position, the concealing web 40 is visible, in particular unwound, and conceals, below the shelf 12, the inner space.

Preferably, the concealing web 40 has an appearance similar to that of the visible wall 11, so as to allow a good integration.

The operation of the inner organ 10 will now be described in more detail.

In FIG. 1, the shelf 12 is shown in the retracted position. Its lower face 14 is visible, and is flush with the visible wall 11. The inner organ 10 thus has a homogeneous appearance.

To be transitioned to the deployed position, the shelf 12 is pulled upward, such that the cursor 26 moves along the first rail 24, and the blocking organ 32 moves along the second rail 34.

Due to the shape of the first rail 24, the movement of the shelf 12 causes the separation of the rod 28 with respect to the first rail 24, which results in tilting the shelf 12 around the pivot link 30. This tilting is done until the deployed position of FIG. 2.

In this position, the blocking organ 32 is at the high end 34b of the second rail 34. The shelf 12 having tilted around the pivot link 30, the second wall 38 cooperates with the second face of the blocking element 32, such that the shelf 12 cannot pivot further downward (clockwise direction in FIG. 2) around the pivot link 30. It is therefore possible to use the shelf 12 by placing objects on it.

It should be noted that, in the deployed position, the web 40 covers the opening, which is covered by the shelf 12 in the retracted position.

To return to the retracted position, the shelf 12 is tilted upward (counterclockwise direction in FIG. 2) around the pivot link 30. Each rod 28 then moves downward, driving the cursor 26 toward the lower end 24a of the first rail 24. The shelf 12 is thus guided toward its retracted position. This shelf 12 is for example moved toward its retracted position under the effect of gravity.

During this movement, the web 40 is wound by its guide, to return to its position visible in FIG. 1. The web 40 being connected to the shelf 12, it does not need additional means to be moved.

In the example previously described, the shelf 12 is moved manually. However, in a variant, it is possible to provide automated means for moving the shelf 12.

It will be noted that the shelf 12 can be incorporated into an air vent such that, in the retracted position, the free end 20 forms part of a lower wall of the air vent and, in the deployed position, the connecting end 18 forms this same part of the lower wall of the air vent.

It clearly appears that the embodiment of the invention described above provides a compact solution, having an optimal integration, and comprising a simple mechanism. The invention in this embodiment provides a fluid kinematic: the shelf 12 is able to be deployed and to retract according to a single movement combining rotation and translation.

The invention claimed is:

1. An inner organ for a vehicle, including a retractable shelf, extending between a free end and a connecting end for connecting to a movement mechanism, the retractable shelf being deployable between a retracted position and a deployed position, wherein the movement mechanism includes:

at least one first rail, extending between a lower end and an upper end, for each first rail, a cursor connected to the first rail and translatable along this first rail, and coupled to the connecting end of the retractable shelf, and a blocking element for blocking the retractable shelf in the deployed position, connected to the connecting end of the retractable shelf by a pivot link, and movable along a second rail, wherein, when the retractable shelf is in the deployed position, the blocking element cooperates with a wall of the retractable shelf such that the retractable shelf cannot pivot downward around the pivot link.

2. The inner organ according to claim 1, including a visible wall, the retractable shelf having a lower face and an upper face, and being configured so that in the retracted position, the lower face is flush with the visible wall.

3. The inner organ according to claim 1, wherein the first rail has a curved portion.

4. The inner organ according to claim 1, wherein the cursor is coupled to the retractable shelf by means of a rod.

5. The inner organ according to claim 4, wherein, in the retracted position, the cursor is at the lower end of the first rail and the rod extends parallel to the first rail, and in the deployed position, the cursor is at the upper end of the first rail, and the rod is separated from the first rail.

6. The inner organ according to claim 1, wherein the blocking element includes an extension substantially parallel to the second rail, having a first face facing toward the second rail and a second face opposite the first face, and the retractable shelf includes, at its connecting end, a recess formed by first and second planar walls, coming together at the pivot link, such that:

the first wall comes into contact with the first face of the blocking element in the retracted position, and the second wall comes into contact with the second face of the blocking element in the deployed position.

7. The inner organ according to claim 1, wherein the inner organ is hollow and includes an inner space, and includes a masking web, coupled to the connecting end of the retractable shelf, suitable for being hidden in the retracted position, and visible in the deployed position so as to hide the inner space below the retractable shelf.

8. The inner organ according to claim 1, wherein the inner organ is one of the group consisting of a dashboard, a door panel, a center console, and a rear seat panel.

9. The inner organ according to claim 1, wherein the inner organ is hollow and includes an inner space, each first rail and each second rail being housed in the inner space.

10. A motor vehicle, including an inner organ, the inner organ including a retractable shelf, extending between a free end and a connecting end for connecting to a movement mechanism, the retractable shelf being deployable between a retracted position and a deployed position, wherein the movement mechanism includes:

at least one first rail, extending between a lower end and an upper end, for each first rail, a cursor connected to the first rail and translatable along this first rail, and coupled to the connecting end of the retractable shelf, and a blocking element for blocking the retractable shelf in the deployed position, connected to the connecting end of the retractable shelf by a pivot link, and movable along a second rail, wherein, when the retractable shelf is in the deployed position, the blocking element cooperates with a wall of the retractable shelf such that the retractable shelf cannot pivot downward around the pivot link.

* * * * *